Dec. 26, 1922.

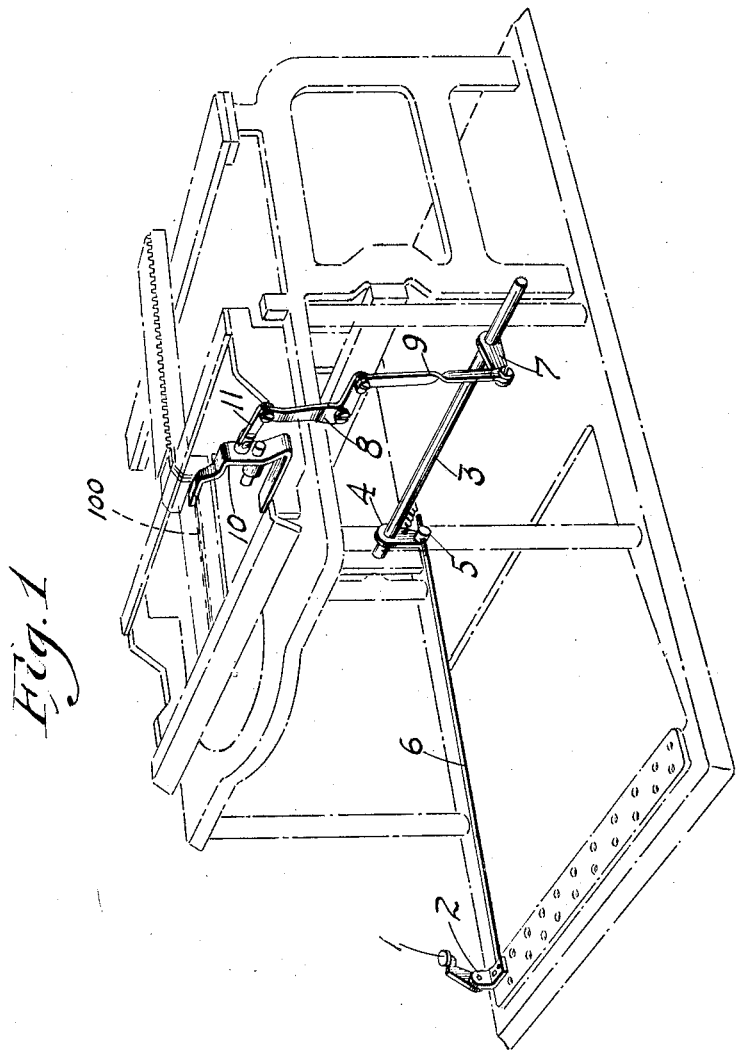

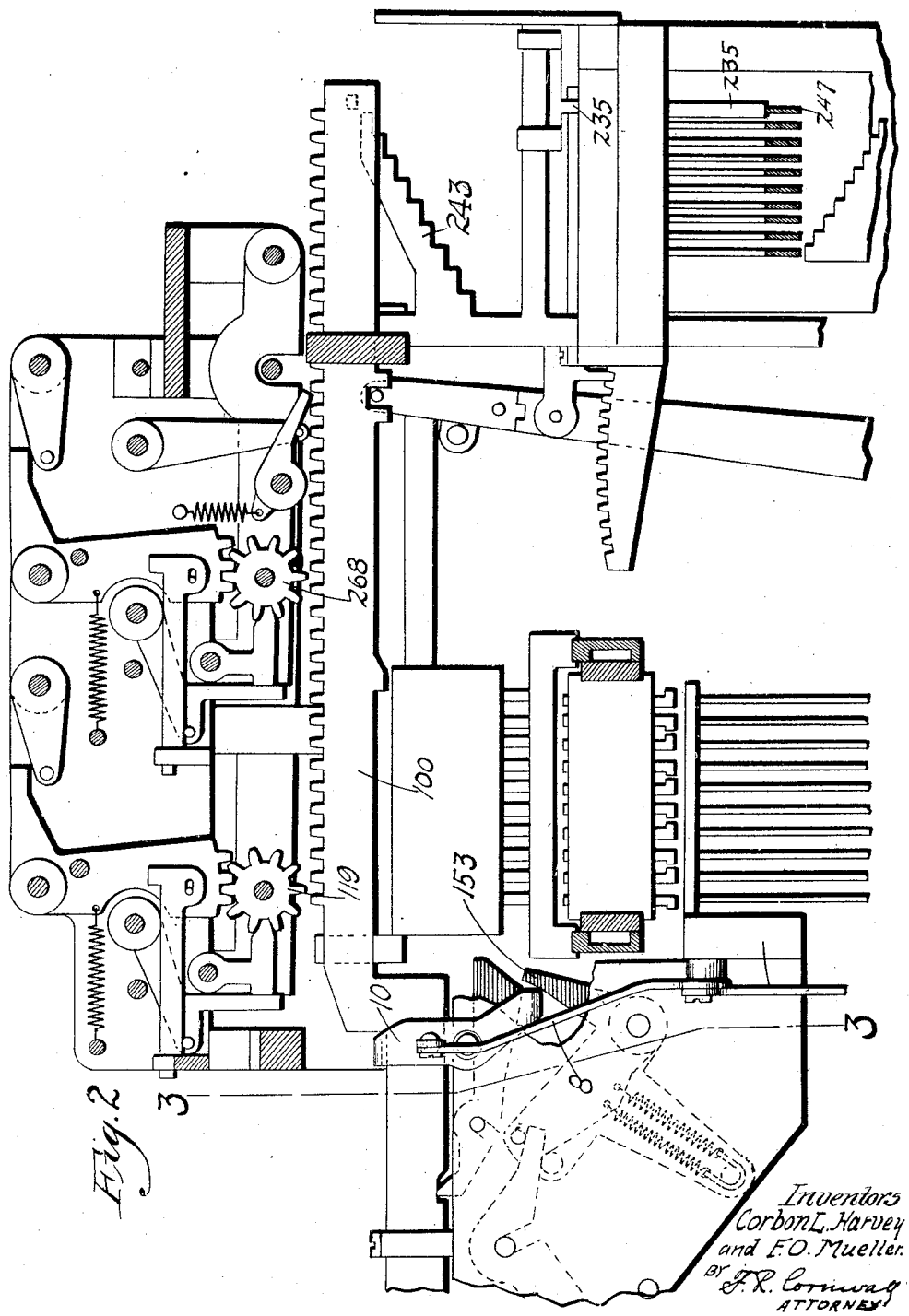

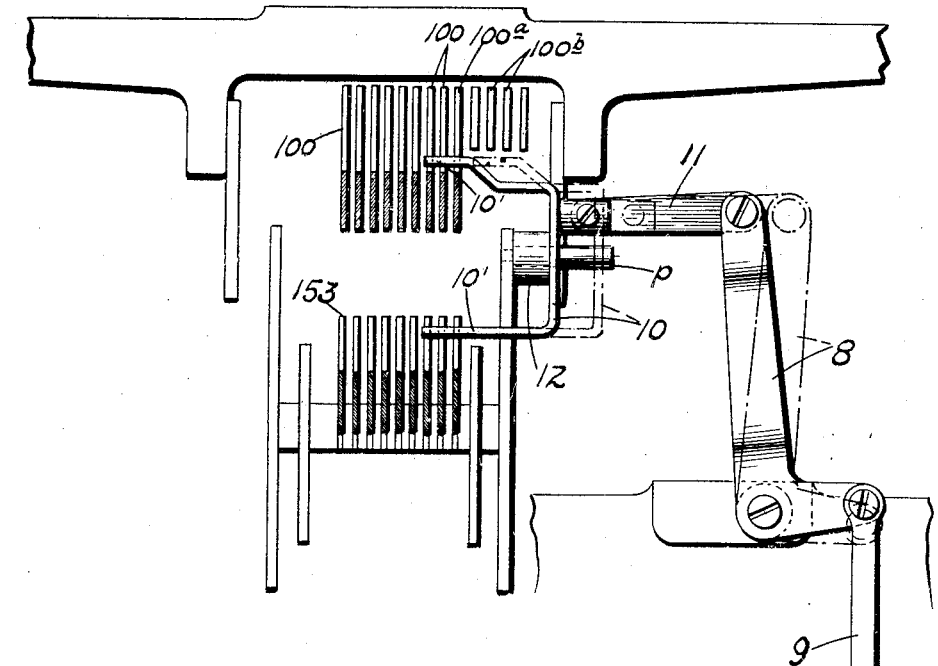
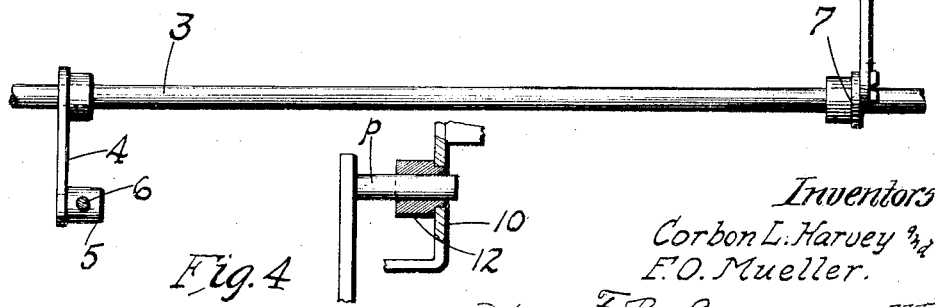

C. L. HARVEY ET AL.
CALCULATING MACHINE.
FILED NOV. 18, 1920.

Inventors
Corbon L. Harvey and
F. O. Mueller
By F. R. Cornwall Atty

Dec. 26, 1922.

C. L. HARVEY ET AL.
CALCULATING MACHINE.
FILED NOV. 18, 1920.

INVENTORS.
Corbon L. Harvey and
F. O. Mueller.
By F. R. Cornwall
ATTORNEY

Patented Dec. 26, 1922.

1,440,145

UNITED STATES PATENT OFFICE.

CORBON L. HARVEY AND FREDERICK OTTO MUELLER, OF ST. LOUIS, MISSOURI, ASSIGNORS, BY MESNE ASSIGNMENTS, TO BURROUGHS ADDING MACHINE COMPANY, A CORPORATION OF MICHIGAN.

CALCULATING MACHINE.

Application filed November 18, 1920. Serial No. 424,971.

*To all whom it may concern:*

Be it known that we, CORBON L. HARVEY and FREDERICK OTTO MUELLER, citizens of the United States, residing at St. Louis, Missouri, have invented a certain new and useful Improvement in Calculating Machines, of which the following is a full, clear, and exact description, such as will enable others skilled in the art to which it appertains to make and use the same, reference being had to the accompanying drawings, forming part of this specification, in which—

Figure 1 is an outline perspective view of the machine with our improved blocking-off mechanism applied thereto.

Figure 2 is a sectional view through the upper rear portion of the machine, showing the blocking-off mechanism in side elevation.

Figure 3 is a sectional view on line 3—3 of Figure 2 as seen from the front.

Figure 4 is a detail view of one of the bearings.

This invention relates to new and useful improvements in calculating machines of the Moon-Hopkins type, such as disclosed in United States Letters Patent No. 1,026,443, dated May 12, 1912; United States Letters Patent No. 1,143,241, dated June 15, 1915; and also United States Letters Patent No. 1,336,904, dated April 13, 1920.

The Moon-Hopkins billing machine operates on the decimal system, as disclosed in the above patents, and is, therefore, capable of performing examples involving the multiplication of any number representing the quantity of anything, such as pounds, bales, or barrels by the price per pound, bale, or barrel, and in that way secure a correct product or answer. To this extent, this machine may also be operated under the French monetary system, or any other monetary system involving the use of decimals or tenths. However, the English monetary system involves fractions of different multiples than ten, as, for instance, four farthings equal one penny, twelve pence equal one shilling, and twenty shillings equal one pound (the guinea not being considered in this table). It is, therefore, obvious that in computing quantities by multiplying the number of pieces by the price per piece, pound, bale, or whatever the unit is, it would ordinarily not be possible to ascertain the product under the English system on any decimal machine. The ordinary method, as usually adopted, would be to perform such an example on paper by the use of a pencil, or possibly by reference to printed computing tables.

It is, therefore, the object of the present improvement to provide a standard Moon-Hopkins billing machine that will be modified in construction so as to be capable of direct calculations in British currency, explained in detail in the following example.

In computing the price of goods under the English system, say for instance, where the price of cotton is represented as 22.32 pence per pound (weight) and there are 36,874 pounds (weight) in the shipment and it is desired to obtain the extensions on the invoice in pounds, shillings and pence, (English money), the price may vary from day to day and may therefore be deemed, in this instance, as the multiplier, whereas the number of pounds (weight) thus becomes the multiplicand.

Figure 8:
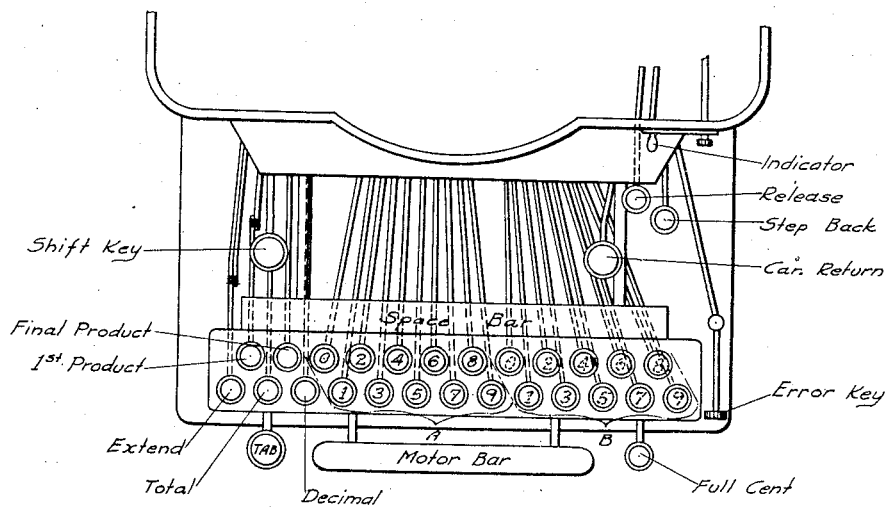
Figure 8 is a plan view of the keyboard showing the disposition of the keys of a standard Moon-Hopkins billing machine.

The first operation is to ascertain the cost in pence of 36,874 pounds which is accomplished by setting up 36,874 in the multiplier, by registering 36,874 on the adding keys, group A of Figure 8, then pressing the extend key and the motor bar (Figure 8). This operation sets the number 36,874 directly into the multiplying devices (pendants 235) as fully described in Patent No. 1,143,241. It is understood after this operation that both the front and rear register wheels 119 and 268, respectively, are clear. With 36,874 as our multiplicand, we now multiply by 22.32, the price in pence per pound, by operating the multiplier keys arranged in openings (group B), which multiplying operation accumulates the product 823027⁶ in the rear register wheels 268. However, there are two more digits following the "6," to which extent it is not necessary to carry the result, so the digits after the 6 are dropped from the result by operating the step-back key twice, (Figure 8). As will be noted, the product obtained in the particular example under consideration shows a small raised 6 which has been printed by one of the type on the tenths decimal rack bar. The type of Moon-Hopkins billing machine employed for this character of billing has but one decimal rack bar which is provided with type designed to print small raised numbers to indicate a decimal. The multiplying operation and the step-back mechanism is described in Patent No. 1,336,904.

The total cost in pence is now in the rear register 268 of the machine from which location it will be necessary to transfer said cost to the first set of adding wheels 119 of the front register, and clear or restore the pendants 235, which is accomplished by adjusting the indicator for the No. 1 register, pressing the first and final product keys, and then operating the motor key, the results of which operations are described in Patent No. 1,143,241. The product so transferred is not printed and does not appear on invoice. By pressing the final product key at the same time, the multiplying devices are cleared and our first multiplicand 36874 eliminated, the pendants 235 being restored to normal. It is now necessary to convert our cost in pence to cost in pounds, which is done by multiplying the cost in pence by the reciprocal of 240 (.004166667), the number of pence in a pound. In order to do this, the total pence 823027$^6$ must be transferred into the multiplying devices, i. e., pendants 235, from the forward register 119. This is done by pressing the total and extend keys (Figure 8) and pressing the motor bar, whereupon the pendants 235 are positioned to represent 823027$^6$, the decimal 6 being represented by the decimal pendant which is positioned by the decimal rack bar 100$^a$. With total pence now as a multiplicand, we now multiply by .4166667, the above reciprocal, with the two decimal places in front of the "4" eliminated, thereby enabling us to further carry out the product. After this multiplying operation, our product, the cost in pounds and the decimal part of a pound, is in the rear register. This product 34292819410092 is now stepped back seven places to eliminate part of the decimal, leaving the number 3429281 in the rear register in operative relation with the rack bars, the "1" being over the decimal rack bar 100$^a$, the "8" over the units rack bar 100, and the "2" over the tens rack bar 100, 281 being the decimal part of the total cost in pounds as it will be seen by counting the number of decimals in the reciprocal of 240, and the digits 3,429 representing the units pounds (money).

The Moon-Hopkins billing machine used for this particular work is provided with four non-printing clearing racks 100$^b$ which cooperate with the four wheels 268 (at the right) of the lowest order in the rear product register. (See Fig. 7.) These clearing racks 100$^b$ do not cooperate with the register wheels 119 in the forward register nor are they controlled by pendants 235, and in this respect the machine employed for this work now being discussed is like that shown in the Hopkins Patent No. 1,336,904, except that it is provided with eight (whole number) printing rack bars 100, instead of nine. There is, of course, the decimal printing rack bar 100$^a$, making nine type carrying racks or bars, the decimal rack bar 100$^a$ in the actual machine preferably having type characters which print raised small numbers. The four clearing racks 100$^b$ are located and controlled like the two clearing racks in Patent No. 1,336,904.

The whole number 3429 (money pound units) is now printed in the "Pounds" column on the invoice sheet, and cleared from the rear register 268, and amount 823627$^6$ is cleared out of the multiplier, by pressing the final product key and operating the motor bar key. The decimal 281 is retained in the rear register wheels 268, by pressing a blocking key 1, which is operated, in this operation, in conjunction with the final product key.

The blocking key 1 and associated mechanism is the main feature of the present invention and will be described in detail hereafter. Suffice it to say for the present, that when operated, its function is to project a blocking plate (10') into the paths of forward movement of the decimal rack bar 100$^a$, and the units and tens rack bars 100, and prevent displacement therof in the total taking and clearing operations incident to the concurrent operation of the final product key, just above described. Thus in the example under consideration, while the number 3429281 was represented in the rear totalizer (denominated and decimalized) as 342,928.1 the last three numbers, 28.1, standing in the tens, units, and tenths columns (in wheels 268) are blocked against being cleared or yielding their total, and the printing mechanism is at the same time prevented from printing zeros to the right of the partial whole number (3429), as it would ordinarily do, by means of a blocking bar or plate 10' to be hereinafter described more in detail.

Figure 7:
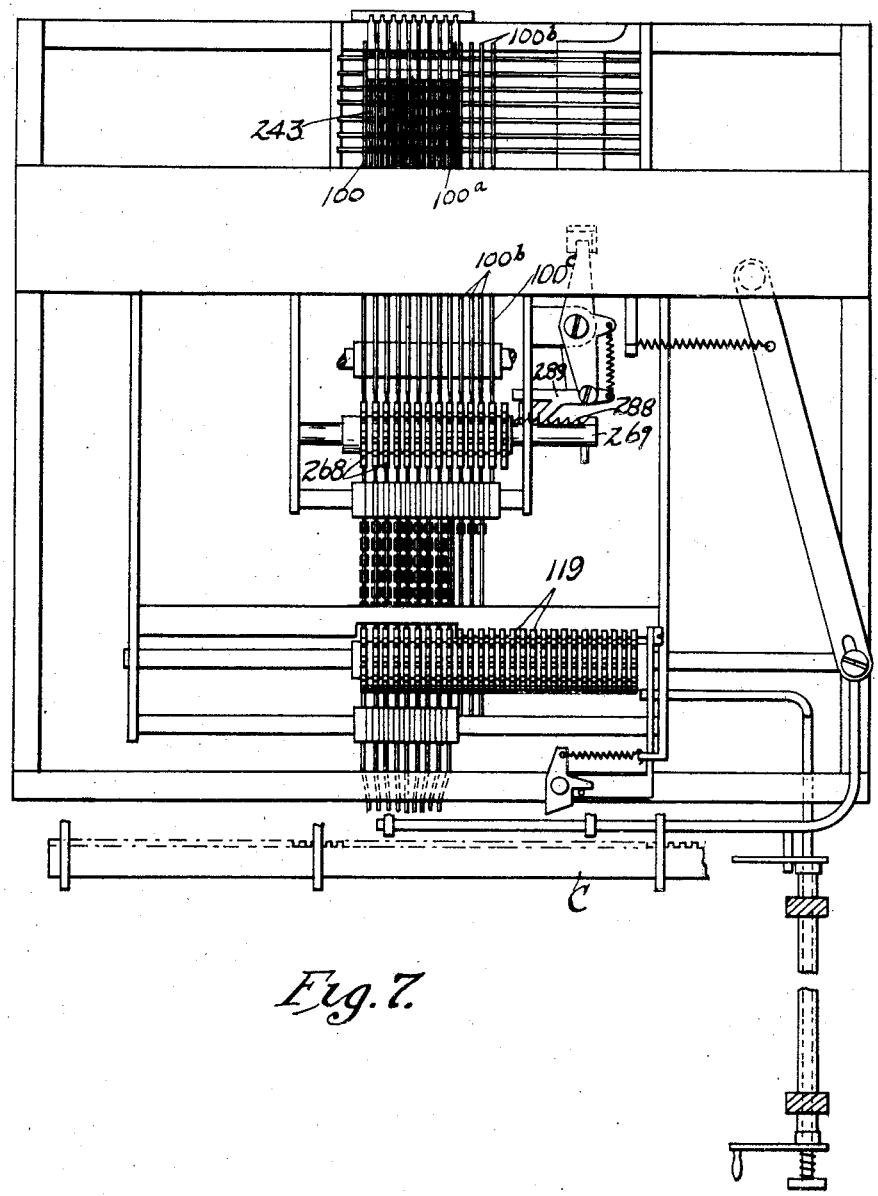
Figure 7 is a plan view of the upper part of the machine, showing the registers.

Having determined the number of pounds in whole numbers, it now becomes necessary to reduce the decimal part of pounds, namely, 281, to shillings, which is done by multiplying 281 by 20, the number of shillings in a pound, to perform which operation, 281 must be transferred from the rear register 268 to the multiplier, (that is, the pendants 235 must be positioned to represent 28.1) at the same time restoring the rear register 268 to its zero position and clearing same. These operations are accomplished by pressing the first product and extend keys, and holding the shift key (shown in Figure 8 and described in Patent No. 1,317,604) down to prevent actuation of the hammers so that 28.1 will not be printed, and thereafter pressing the motor bar. The paper carriage C (a part of which is shown in Figure 7) is now spaced five spaces, by operating space bar (Fig. 8) so as to bring the subsequent result clear of 3429 which has been printed. We now multiply 28.1 by 20 so as to obtain 562.0 which is represented in the product register wheels 268. We now press the blocking and final product keys and subsequently the motor bar, the result of which operations is to print the whole number of shillings (5) in the "Shillings" column of the invoice sheet, clear the same from the rear register 268, and the number 28.1 from the pendants 235, and retain the decimal part of shillings (62.0) in the rear register 268, the blocking key being instrumental in accomplishing the last result, as well as preventing the printing of zeros to the right of the whole number of shillings (5). We must now reduce the decimal part of shillings 62.0 to pence, which is done by multiplying 62.0 by 12, the number of pence in a shilling. In so doing, 62.0 must be transferred from the rear register to the multiplier, simultaneously pressing down the extend key, the first product key, and holding down the shift key and then operating the motor bar, said operations result in the rear register being cleared of 62.0 without printing the same, and which number is transferred to the multiplier, pendants 235.

We now come to the next operation, namely, multiplying 62.0 by 12, after having spaced the paper carriage three times by operating the space bar of the typewriting mechanism to bring the product into a clear printing field, so that the whole number of pence will be printed in the "Pence" column of the invoice sheet. The result of multiplying 62.0 by 12 is 744.0 which is represented in the proper wheels 268 of the rear product register. The depression of the final product and blocking keys, and the subsequent operation of the motor bar would print 7 in the "Pence" column, clearing this number (7) from the rear register and restoring the pendants 235 which represented the multiplicand 62.0, leaving the partial whole number 44. and the decimal, in this instance .0 in the wheels 268 to be transferred back to the pendants 235 and multiplied by 4, (the number of farthings in a penny), if this was desirable, but in ordinary transactions, in making out bills or invoices in British currency, the extensions stop at "pence" and no farthings are used: but if decimals or fractions of pence appear, they, like decimals (mills) or fractions of a cent in United States currency, are either eliminated, if under .50 of a pence, or under .005 (meaning five mills or one-half of a cent) or if over one half of a penny or a cent, are computed as a whole penny or cent, as the case might be. In the present example, we shall disregard farthings, and stop our computations at pence, so that if we have less than one-half (.50) of a penny, we shall eliminate it, and if we have more than one-half or over .50 of a penny, we shall compute it as a whole penny, and add it to the former number of pence (7) making the whole or total number of pence 8. Thus, in the present example, instead of pressing the final product and blocking keys, and then operating the motor bar, we first press the release key (shown in Figure 8), which operates the same as the corresponding release key in Patent No. 1,317,604, and results in restoring the rear product register to its normal or starting position, at the right, in which position 7 is represented as a whole number in the units column, and .44 as a decimal in the tenths and hundredths wheels 268. As this is the final operation in the present example we wish to restore the pendants 235 and clear the wheels 268, therefore we press the final product key; it is desirable, as this is the final operation of the machine in making this computation, that the machine shall determine whether the partial whole number (44.) which would ordinarily be reserved for further operations, shall be eliminated, or, as the machine is now being operated, this partial whole number 44. being treated as a decimal, shall be further computed as a decimal of pence, or if sufficiently large, be computed as one penny, and added to the precedingly determined whole number of pence (7),—thus making the final number of pence printed on the invoice sheet appear as 8. Before completing the operation, the release key is pressed, thus stepping the rear register 268 back two spaces, and the full cent key, (shown in Figure 8 and described in Patent No. 1,026,443), the two product keys and the motor bar are also pressed down, in order to clear the rear register 268 and restore same to normal position, the operations being the same as heretofore set forth, the product 7 being printed and the multiplier and rear register wheels 268 cleared.

The shift key (also called non-print key), the step back, release and full cent (split cent) keys as well as the entire keyboard are substantially the same as those shown in Patent No. 1,317,604.

The blocking mechanism whereby the decimal part of our result is retained in the wheels 268 may be described as follows:

A key 1 in the shape of a bell crank is pivotally mounted on a bracket 2 fixed to the key plate, and a rock shaft 3 is journaled in the frame of the machine substantially below the hammer bell crank levers 153. A lever arm 4 is pinned to the rock shaft 3 in line with the key 1, said lever having a stud 5 loosely mounted on its extremity, into which screws one end of a connecting rod 6, the opposite end of the connecting rod being fixed to the lower lever arm of the key 1. A second lever 7 is pinned to rock shaft 3 near the side of the machine opposite to that where the lever 4 is mounted and the lever 7 is connected with a bell crank lever 8 by a connecting rod or link 9, said bell crank lever 8 being pivoted on the frame of the machine. The upper end of the bell crank lever 8 is connected to a U-shaped blocking bar 10 by a link 11, said blocking bar 10 being slidably mounted on a pin $p$ projecting from a stationary part of the machine. In order that the blocking bar may slide on the pin $p$ freely without rocking motion, a bushing 12 is secured to said blocking bar through which bushing the pin $p$ projects, thereby furnishing increased bearing for said blocking bar.

Figure 5:
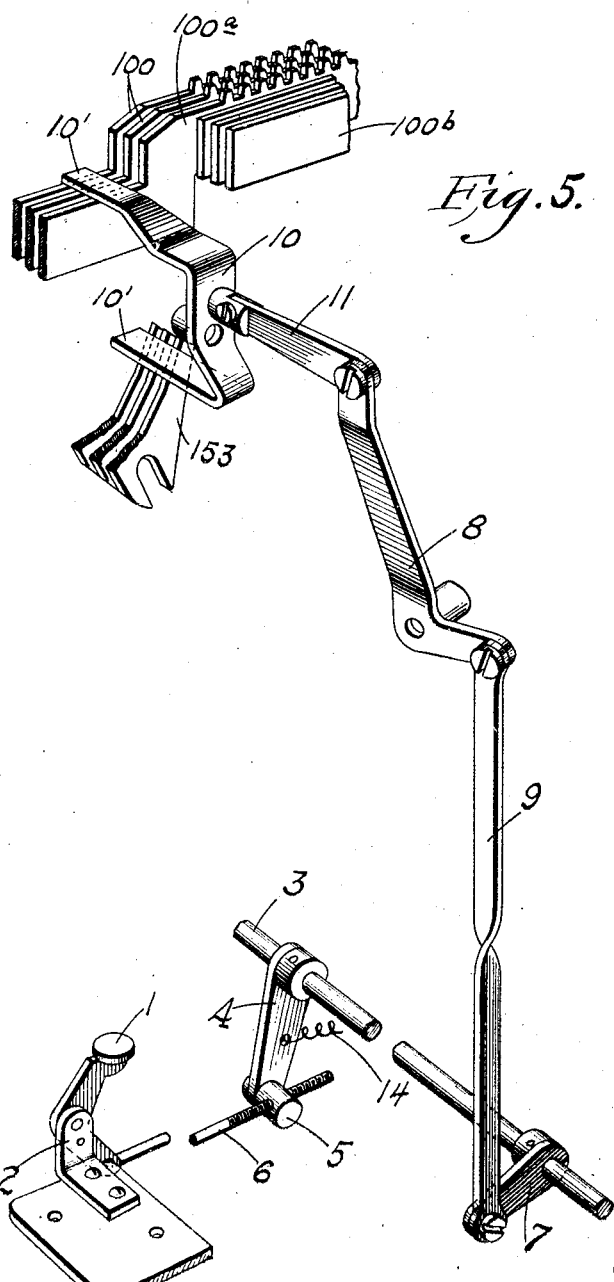
Figure 5 is a detail perspective view illustrating the relation of the added or new parts to the old parts of the machine.
Figure 6:
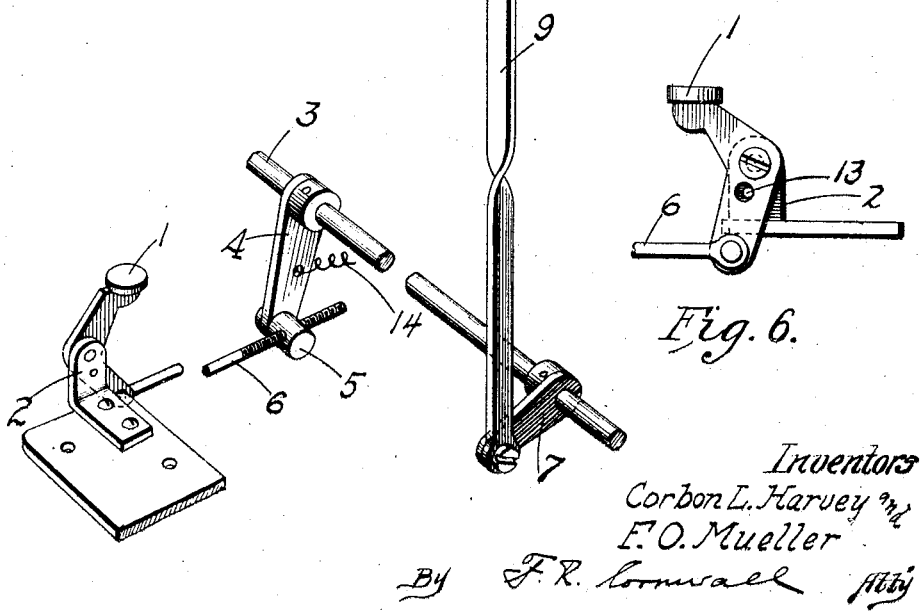
Figure 6 is a side elevational view of the key.

In the normal position of the blocking bar, and connected parts, the key 1 is in its raised position and the blocking bar 10 withdrawn so that the fingers 10' of said blocking bar will be clear of the rack bars 100 and 100ª as shown in the dotted position of Figure 3. However, during the operation heretofore described, when it is desired to lock the units and tens bars 100 and decimal bar 100ª, the key 1 is depressed, the lever 4 drawn forward, whereupon the rock shaft 3 is rocked and the lever 7 elevated so as to raise the short arm of the bell crank lever 8, thereby forcing the blocking bar inwardly and positioning its fingers 10' in front of the tens, units and decimal rack bars as shown full in Figure 3, also in Figure 5.

In order to hold the movement of the blocking key 1 within fixed limits, the lower lever arm of the key 1 is provided with an opening through which a pin 13 projecting from the bracket 2 extends, thereby limiting the movement of the key 1 to contact the edges of the opening with pin 13. After the key 1 has been depressed and the lock bar moved to operative position, said key, lock bar and associated mechanism, are restored to their normal positions upon releasing the key 1 by the coil spring 14, one end of which is fixed to the lever 4, and the opposite end being fixed to a stationary part of the frame of the machine.

From the foregoing description it will be seen that at any time the operator may desire to retain a part of the result in the rear register wheels 268 for further calculation, this may be done by merely depressing the key 1 whereupon the rack bars 100 and 100ª are held against movement as also are the register wheels 268 in mesh with said rack bars. Furthermore, the actuation of the blocking mechanism in nowise interferes with the operation of the machine, said machine being capable of discharging its various functions to the exclusion of the blocking mechanism if desired, in which instance the machine is simply the standard Moon-Hopkins billing machine.

It is obvious from the foregoing that while we have described the present machine as being applicable in computing the price of cotton decimally and recording the extensions in terms of pounds, shillings and pence by means of a blocking mechanism which causes the printing type to record certain numbers of higher order, which numbers appear in the printed record as numbers of lower order, and retaining certain numbers of lower order to be used for further computation, that this same machine can be employed by using the same blocking mechanism in computing a given number of pounds of wheat in terms of bushels and fractions thereof together with the price per number of bushels and the fraction thereof; and also in computing the price of glass where the square inches or square feet are known, to give the number of pieces and compute the price per square foot together with the fraction thereof. Thus, generally stated our present machine may be said to record items or extensions thereof in different terms, as, for instance, in the described illustration in terms of pounds, shilling and pence; or where the machine is used in computing the price of wheat at so much per bushel when the number of pounds of wheat are known in terms of bushels and fractions thereof; or where the machine is used in computing the price of glass at so much per square foot where the price per square foot is given and the number of square feet and square inches is known, in terms of square feet or fractions thereof, together with the number of pieces of glass, if such is desired, and the total price of all of the square feet and fractions thereof.

It is obvious that the present invention is susceptible of modifications, for instance, changing the location of the blocking bar or causing said blocking bar to engage a greater or less number of rack bars, if desired, all of which modifications would fall within the spirit of our invention.

Having described our invention, we claim:

1. A decimal calculating and recording machine designed to be used in making out bills, invoices, or the like, and printing the items or extensions in different terms such as pounds, shillings and pence, the same comprising a product register, actuating devices therefor, printing devices controlled by said product register, and means for blocking one or more of the actuators identified with a denomination or denominations of lower order, whereby the printing devices available to make printing impressions from the higher orders will appear, when printed, as numbers of lower orders.

2. A decimal calculating and recording machine designed to be used in making out bills, invoices, or the like, and printing the items or extensions in different terms such as pounds, shillings and pence, the same comprising a product register, actuating devices therefor, printing devices controlled by said product register, and means for blocking one or more of the actuators identified with a denomination or denominations of lower order whereby the printing devices available to make printing impressions from the higher orders will appear, when printed, as numbers of lower orders, the blocked digits in the lower orders being retained in the product register for future computation.

3. The combination with recording devices, of multiplying devices, including a product register, and means for blocking certain wheels in said product register whereby a number recorded therefrom appears as a number of lower order than as represented in said product register at the time of making such record.

4. The combination with recording devices, of multiplying devices including a product register, said product register being in control of said recording devices, and means for clearing certain of the wheels of said product register and making a record thereof, and retaining a number in other wheels of said product register for use in other multiplying operations.

5. The combination with recording devices, of multiplying devices including a product register, said register being in control of said recording devices, and means for clearing and making record of numbers represented by certain of the wheels in said product register, and means for retaining a number in certain other of the wheels in said product register, said last mentioned means preventing a record being made of such retained number.

In testimony whereof we hereunto affix our signatures this 13th day of November, 1920.

CORBON L. HARVEY.
FREDERICK OTTO MUELLER.